United States Patent
Sato (10) Patent No.: US 7,551,870 B2
(45) Date of Patent: Jun. 23, 2009

(54) IMAGE PROCESSING DEVICE WITH A WHEELCHAIR ACCESSIBLE OPERATION UNIT

(75) Inventor: Akinori Sato, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 671 days.

(21) Appl. No.: 10/249,119

(22) Filed: Mar. 17, 2003

(65) Prior Publication Data
US 2003/0218785 A1 Nov. 27, 2003

(51) Int. Cl.
*H04N 1/46* (2006.01)
(52) U.S. Cl. .............. 399/81; 358/1.1; 358/1.15; 399/126; 345/156; 345/173
(58) Field of Classification Search ............ 358/1.15, 358/1.1; 345/156, 173; 399/81, 126
See application file for complete search history.

(56) References Cited

U.S. PATENT DOCUMENTS

| | | | | |
|---|---|---|---|---|
| 4,562,987 A | * | 1/1986 | Leeds et al. ............ 248/278.1 |
| 5,051,009 A | * | 9/1991 | Sugiura et al. ......... 400/120.16 |
| 6,259,866 B1 | * | 7/2001 | Kabumoto et al. ............ 399/1 |
| 6,452,571 B1 | * | 9/2002 | Chung ............................ 345/7 |
| 6,492,974 B1 | * | 12/2002 | Nobuchi et al. ............. 345/156 |
| 6,658,272 B1 | * | 12/2003 | Lenchik et al. .......... 455/575.1 |
| 6,836,340 B2 | * | 12/2004 | Yoshihara et al. .......... 358/1.15 |
| 6,850,784 B2 | * | 2/2005 | SanGiovanni ............ 455/575.1 |
| 6,975,415 B2 | * | 12/2005 | Yamade ..................... 358/1.13 |
| 7,020,493 B2 | * | 3/2006 | Ohmura et al. ............. 455/566 |
| 2004/0061677 A1 | * | 4/2004 | Hejza Litwiller ........... 345/156 |
| 2004/0127262 A1 | * | 7/2004 | Ohno .......................... 455/566 |

* cited by examiner

Primary Examiner—David K Moore
Assistant Examiner—Peter K Huntsinger
(74) Attorney, Agent, or Firm—Global IP Counselors, LLP (57) ABSTRACT

An image processing device is disclosed which is easily used by a physically handicapped person who uses a wheelchair. The image processing device includes an operation unit that displays the operational input and the processing state thereof when image processing is being executed. The operation unit is approximately rectangular in shape, and one end in the lengthwise direction thereof is fixed to a shaft 11 that freely rotates.

10 Claims, 15 Drawing Sheets

IMAGE PROCESSING DEVICE WITH A WHEELCHAIR ACCESSIBLE OPERATION UNIT

BACKGROUND OF INVENTION

1. Field of the Invention

The present invention relates to an image processing device equipped with an operation unit that displays the operational input and operational status of an image process.

2. Background Information

Figure 1:
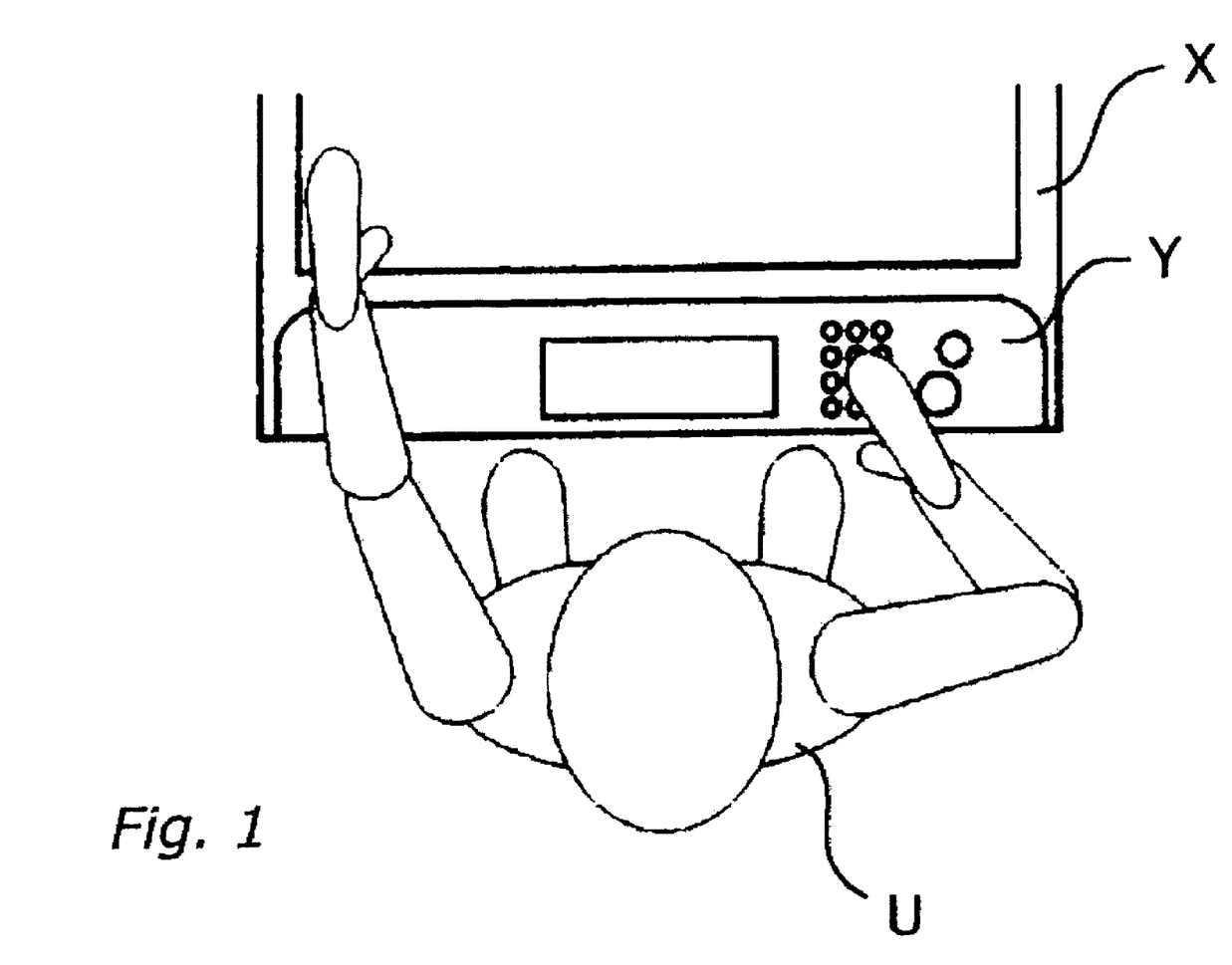
FIG. 1 shows an example of how a conventional image processing device X is used by a non-physically handicapped person.

FIG. 1 shows a conventional image processing device X such as a copying machine and the like.

This image processing device X is provided with an operation unit Y which displays the operational input and operational status of the image process, and which is disposed in a position that is directly in front of a user U that is using the image processing device X.

The aforementioned image processing device X is easy for the user U to use if the user U is not physically handicapped, but is quite difficult to use if the user U is a physically handicapped person who uses a wheelchair. Note that the following description assumes that the user U is a physically handicapped person who must use a wheelchair.

In other words, even if the user U attempts to directly face the operation unit Y of the image processing device X, it will be quite difficult for his or her upper body to approach the operation unit Y because sitting in a wheelchair causes his or her legs to become a hindrance.

Figure 2:
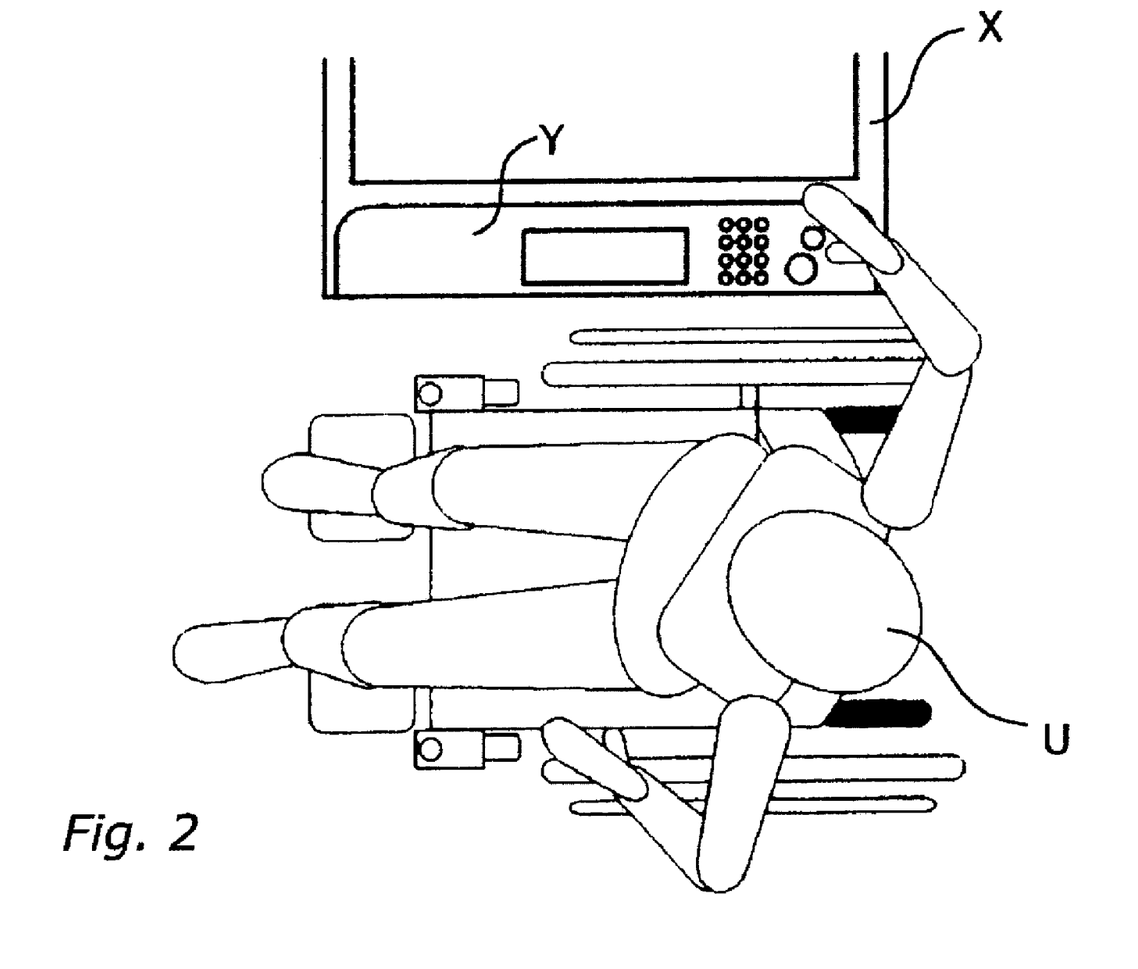
FIG. 2 shows an example of how a conventional image processing device X is used by a physically handicapped person.

In addition, as shown in FIG. 2, even if the user U approaches the operation unit Y of the image processing device X from the side, it will still be quite difficult for the user U to operate the operation unit Y because it will be necessary for him or her to twist their upper body toward it.

Figure 3A:
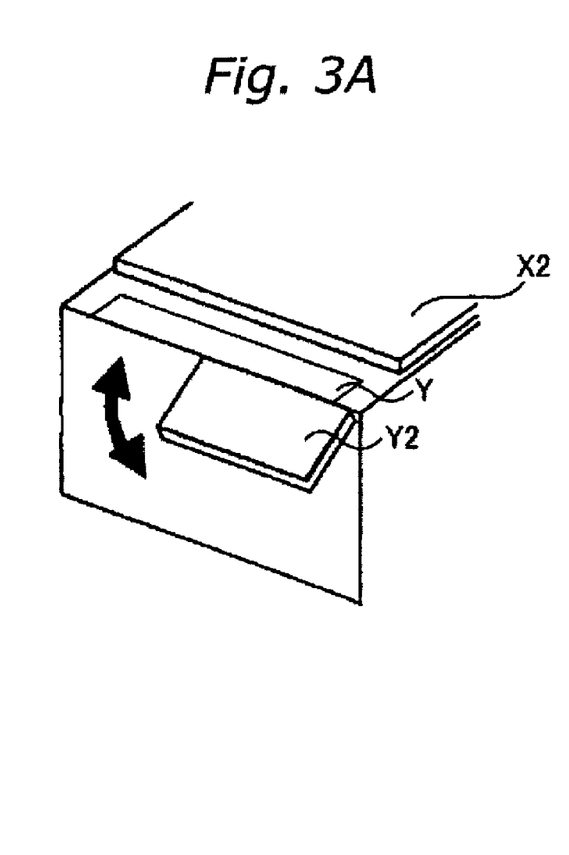
FIGS. 3a and 3b show a example of how a conventional image processing device X2 is used by a physically handicapped person.

In order to solve this problem, FIG. 3a shows a image processing device X2 found in the prior art that includes an operation unit Y2 that has the exact same functions as the aforementioned operation unit Y. The operation unit Y2 is installed on the front wall of the image processing device X2 via a hinge so that it can fold down from a horizontal position to a position parallel with the front wall.

Figure 3B:
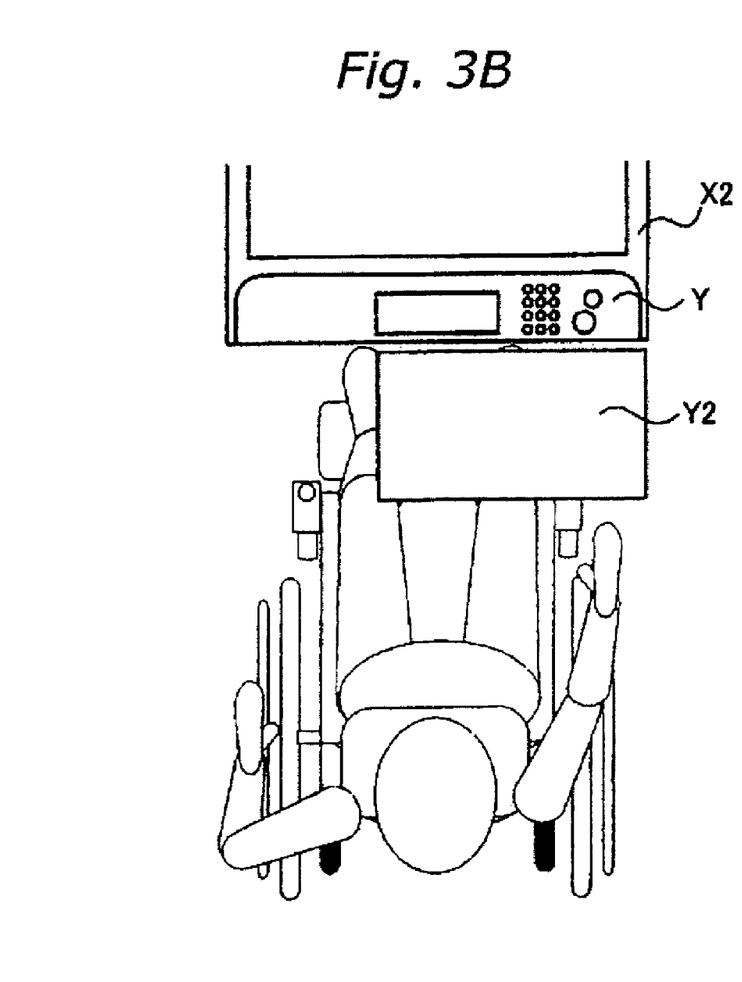

As shown in FIG. 3b, by lifting the operation unit Y2 from its folded position parallel to the front wall of the image processing device X2 up to a generally horizontal position, the operation unit Y2 will project out from the outer periphery of the image processing device X2 and will thereby allow the user U to approach the operation unit X2. Thus, even if the user U approaches the operation unit Y2 from directly in front of the image processing device X2, he or she will be able to operate the device regardless of the fact that their legs are bent in front of them.

However, if, for example, the user U approaches the image processing device X2 and lifts up the operation unit Y2 from its folded position up to the horizontal position, he or she will have to twist or bend their upper body in the wheelchair in order to do so. This movement will be difficult for the user U to perform.

In addition, providing a hinge on the front edge of the operation unit Y of the image processing device X shown in FIGS. 1 and 2, and having the operation unit Y project outward toward the front of the image processing device X by rotating the operation unit Y via the hinge has also been considered.

However, this configuration will cause an increase in costs because it will be necessary to provide a touch panel on both sides of the operation unit Y, and for the same reasons as noted above, it will be difficult for the user to approach and rotate the operation unit Y.

Furthermore, even if the user U approaches the image processing device from the side thereof in order to vertically rotate an operation unit like the two examples thereof noted above via a hinge, it will still be difficult for the user U because it will be necessary for him or her to turn toward the front thereof after he or she has placed the operation unit in the horizontal position.

SUMMARY OF INVENTION

It is an object of the present invention to provide an image processing device that is equipped with an operation unit that can be easily operated when, for example, a physically handicapped person in a wheelchair uses the image processing device.

An image processing device according to the present invention is comprised of a main body having an image processing unit therein which forms and processes images, and an operation unit having an operation/display screen for directing the operation of the image processing device and for displaying the processing state of the image processing device.

The operation unit in this device can be rotated and placed into a position that is easy to operate. Thus, for example, a physically handicapped person who uses a wheelchair can operate the image processing device by simply approaching the operation unit from whatever direction is easiest for them, thus eliminating the need for physically handicapped persons to twist or bend their upper body as with conventional image processing devices. In addition, an operator is able to face the operation/display surface because it rotates around the same plane.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF DRAWINGS

Referring now to the attached drawings which form a part of this original disclosure.

DETAILED DESCRIPTION

An embodiment of the present invention will be described below with reference to the figures.

Figure 4:
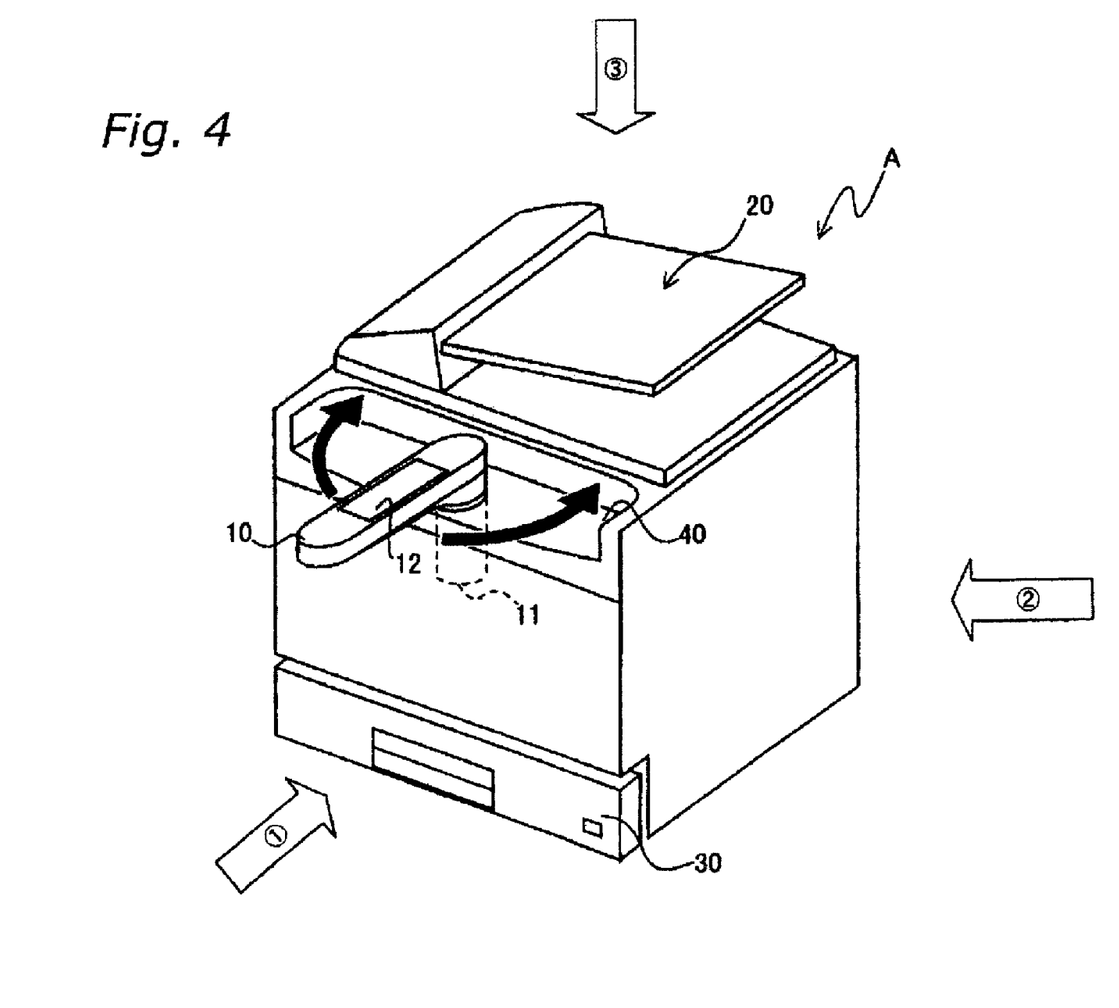
FIG. 4 is a perspective view of an image processing device A according to an embodiment of the present invention.

FIG. 4 shows an exterior view of an image processing device A according to the present invention.

The image processing device A includes a main body 1, an operation unit 10 for inputting commands in and displaying the operational state of the image processing device A when it is processing images, a scanner 20 disposed on the upper portion of the main body 1, and a paper supply cassette 30 disposed on the lower portion of the main body 1. The main body 1 includes an image processing unit for forming and processing images, and an image forming unit that forms the images onto a sheet material. The scanner 20 has a scanning function that reads original documents.

The operation unit 10 will now be described in detail.

The operation unit 10 includes a liquid crystal touch panel 12 on the upper surface thereof which serves to input commands into and display the operational state of the image processing device A when it is processing images. The operation unit 10 is approximately rectangular in shape, and has arcuate curves formed on both ends in the lengthwise direction thereof. In addition, a shaft 11 is provided on a first end of the operation unit 10 in the lengthwise direction thereof, and as shown in FIG. 4, this shaft 11 is installed in the interior of the image processing device A such that it is freely rotatable therewith. Thus, the operation unit 10 freely rotates about the first end thereof in an approximately horizontal plane. An angle sensor disclosed in Japanese Published Patent Application 2001-33275 is installed in the shaft 11 (not shown in the figures), and serves to detect the angle of rotation of the operation unit 10.

In addition, a long concave portion 40 is formed along the upper front edge of the main body 1 in the horizontal direction. The length in the horizontal direction of this concave portion 40 is about twice the length in the lengthwise direction of the operation unit 10. Furthermore, the width of the concave portion 40 is slightly larger than the width of the operation unit 10. The shaft 11 fixed to the first end of the operation unit 10 is disposed in the center of the concave portion 40 in the lengthwise direction. Thus, the operation unit 10 can be stored in the concave portion 40 so that it does not project out from the image processing device A, or can be brought out from the concave portion 40 by rotating the operation unit 10 in either direction. Furthermore, the height of the operation unit 10 and the depth of the concave portion 40 are set such that the upper surface of the operation unit 10 and the upper surface of the main body 1 are flush with each other when the operation unit 10 is stored in the concave portion 40.

Next, the rotation of the operation unit 10 in an approximate horizontal plane will be described with reference to the plan view in FIG. 5 (the arrow 3 shown in FIG. 4).

Figure 5A:
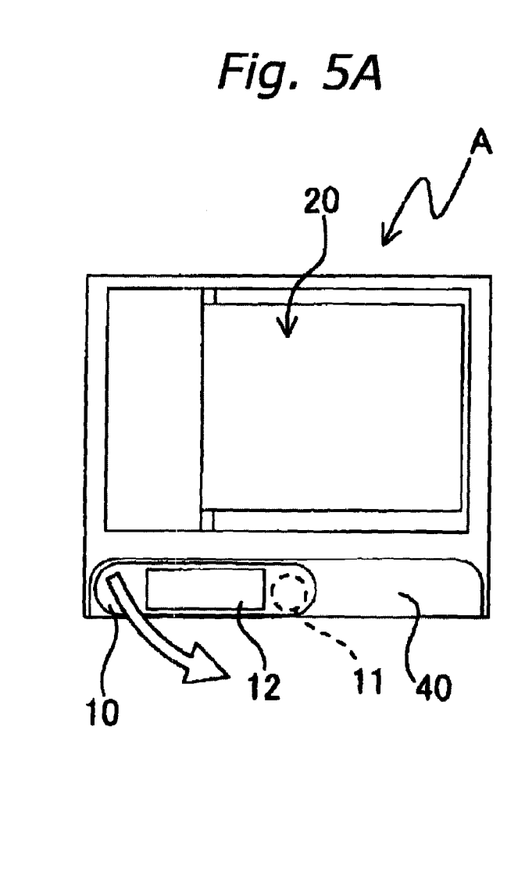
FIGS. 5a to 5c show the movement of an operation unit on the image processing device A.
Figure 5B:
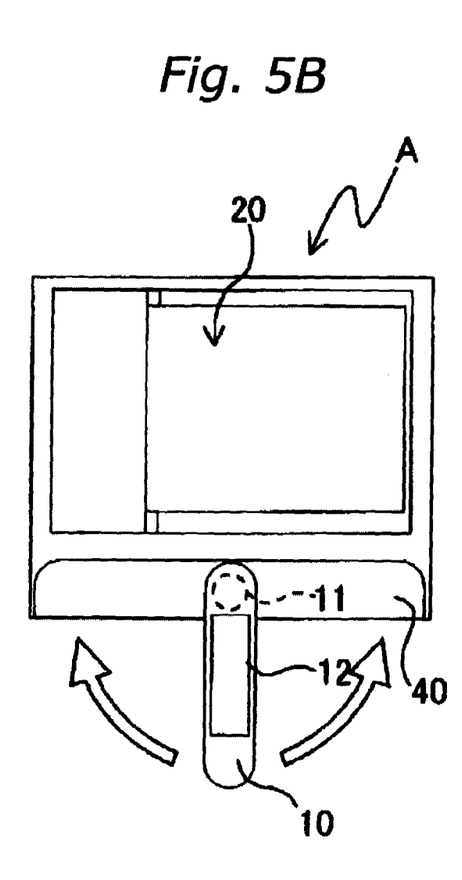

FIG. 5(a) shows the operation unit 10 stored on the left side of the concave portion 40, and by rotating the operation unit 10 in the direction of the arrow (counterclockwise) from this stored position, the operation unit 10 will project out from the front of the image processing device A as shown in FIG. 5(b). Furthermore, by rotating the operation unit 10 in the counterclockwise direction from the position shown in FIG. 5(b), the operation unit 10 will be stored in the right side of the concave portion 40 (FIG. 5(c)).

Figure 6:
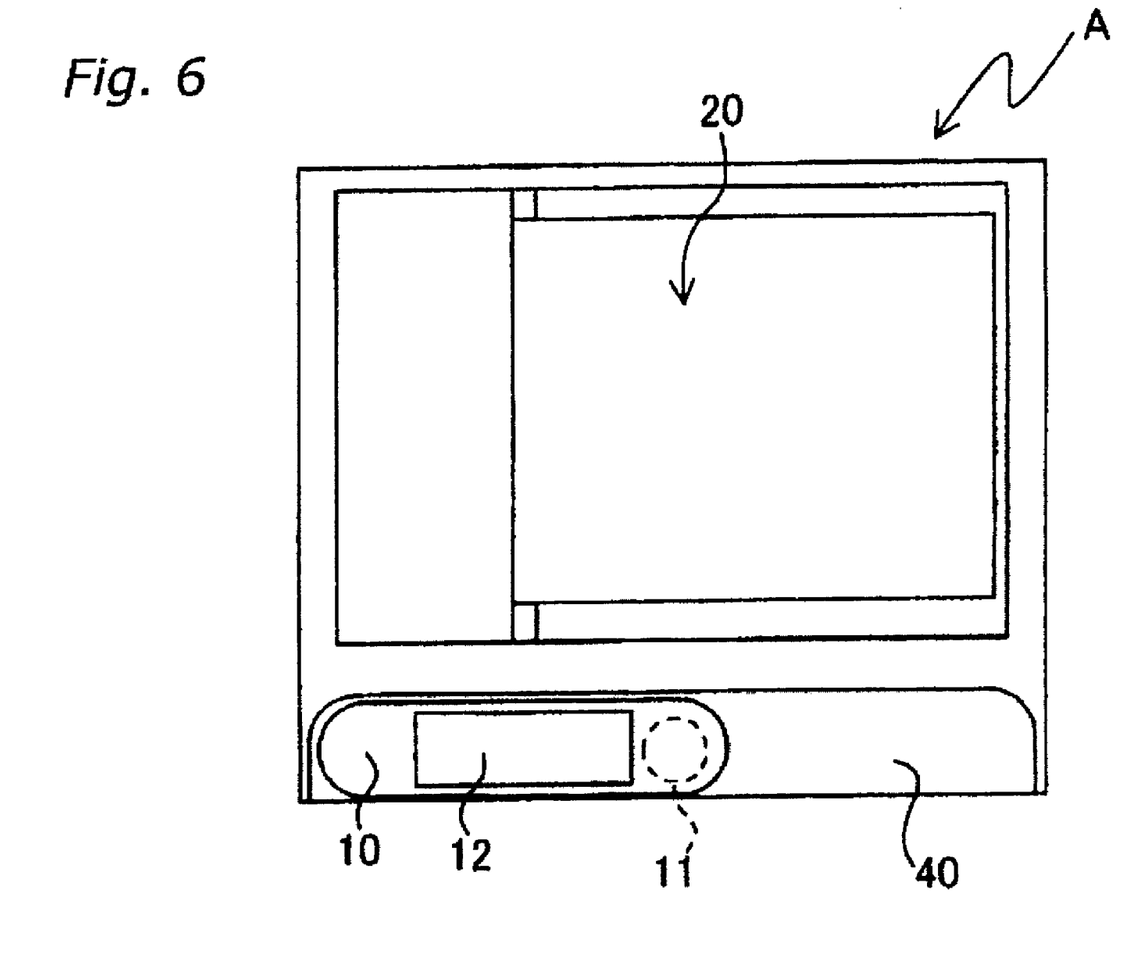
FIG. 6 is a plan view of the image processing device A.
Figure 7:
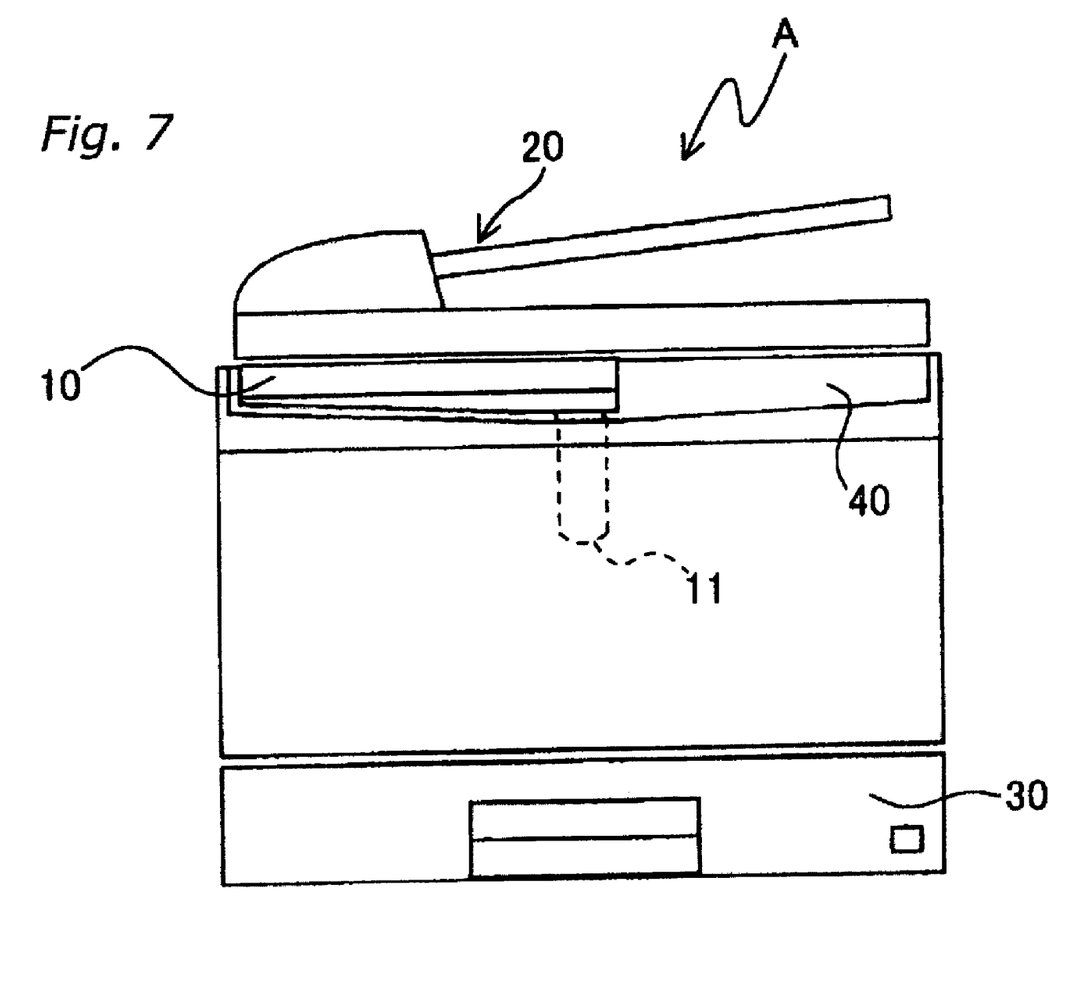
FIG. 7 is a front view of the image processing device A.
Figure 8:
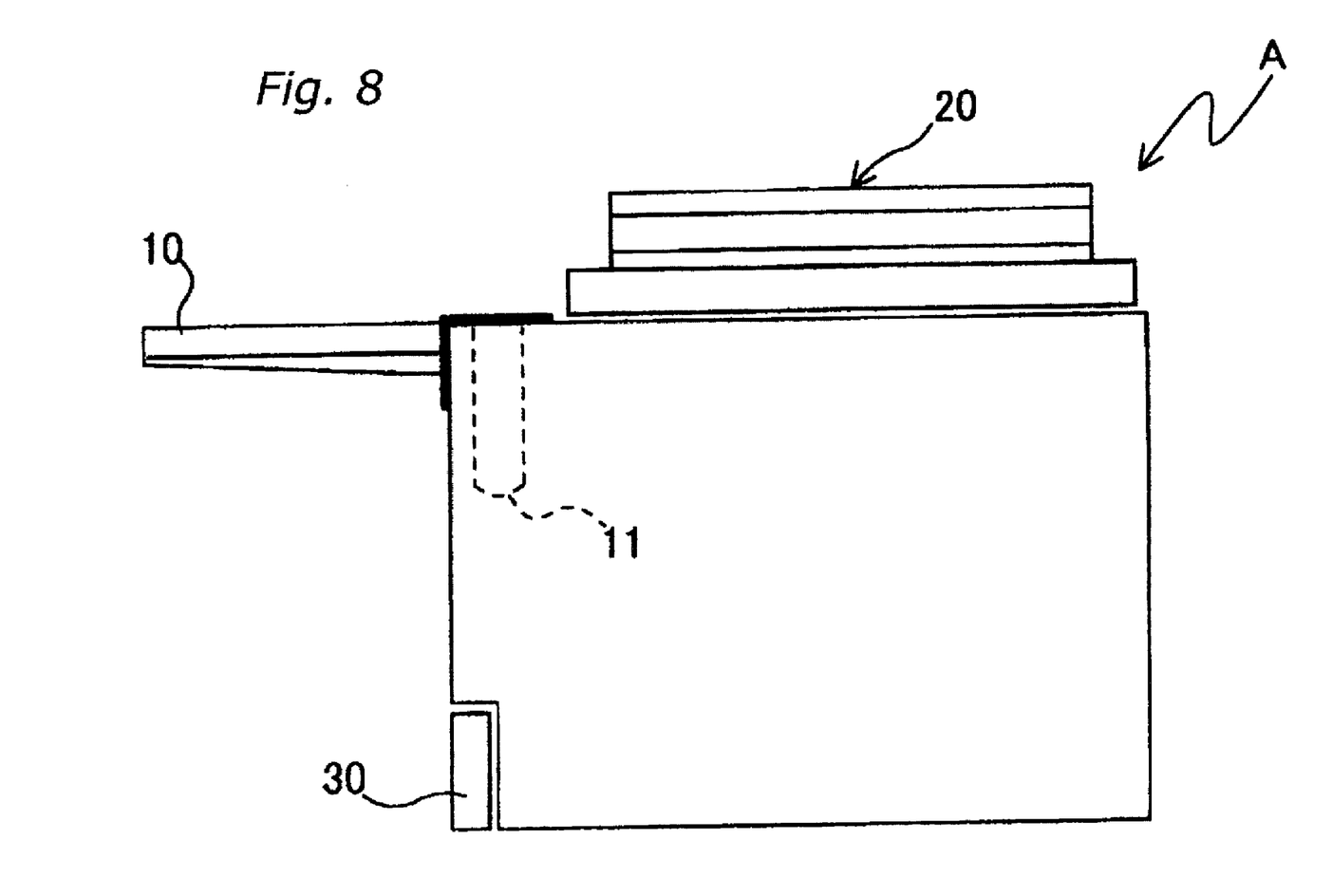
FIG. 8 is a lateral view of the image processing device A.

In addition, FIG. 6 is an enlarged plan view of the configuration shown in FIG. 5(a), FIG. 7 is a front view (in the direction of the arrow 1 in FIG. 4) of the configuration shown in FIG. 5(a), and FIG. 8 is a lateral view (in the direction of the arrow 2 in FIG. 4) of the configuration shown in FIG. 5(a).

Figure 9:
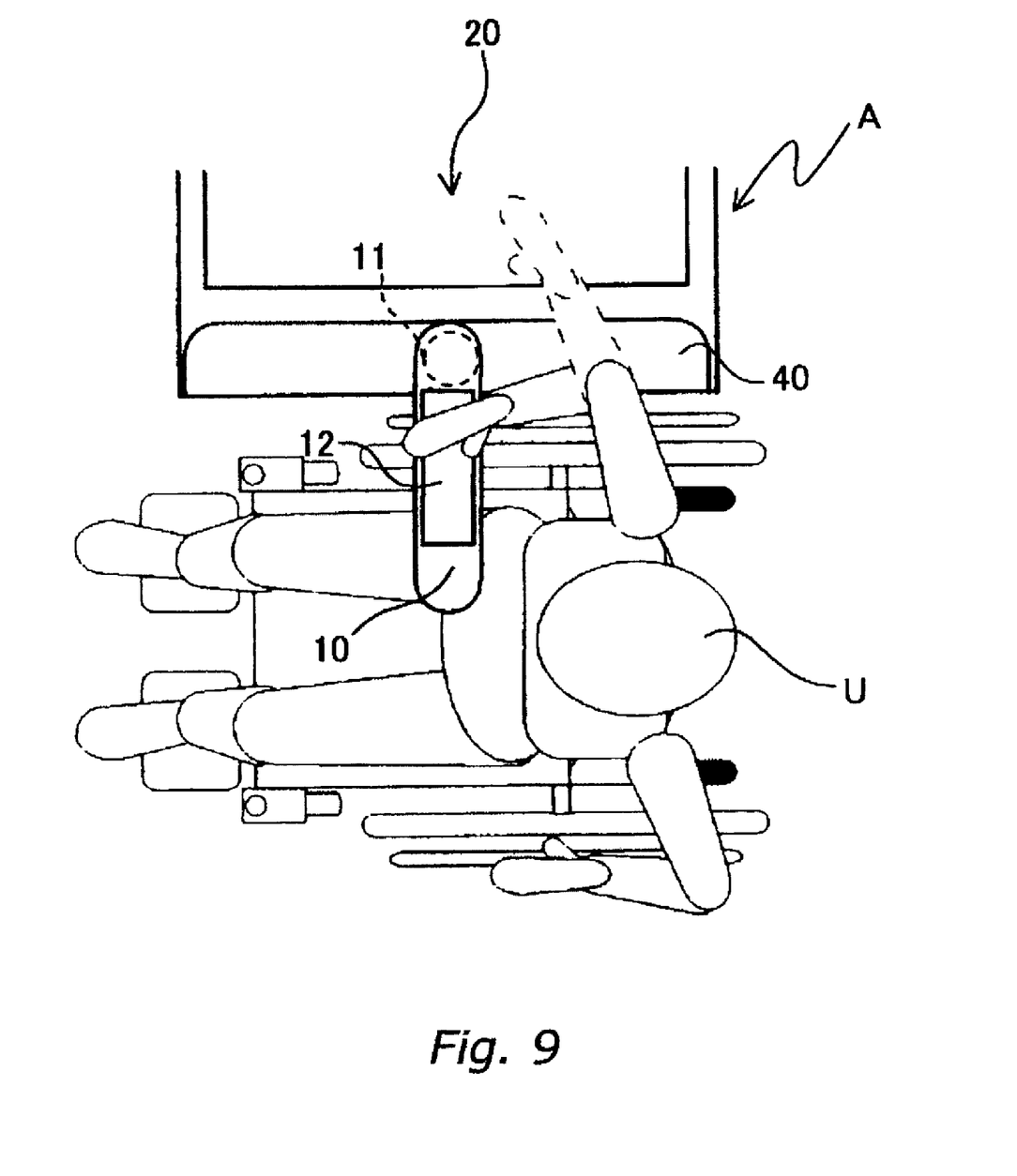
FIG. 9 shows how a physically handicapped person is able to use the image processing device A.

As shown in FIG. 9, if, for example, a user U who is physically handicapped person and uses a wheelchair approaches the image processing device A from the side (has the front of the image processing device A on his or her right side), the user U can easily bring the operation unit 10 in front of him or her by rotating the operation unit 10 with his or her right hand. The CPU in the image processing device A can change the direction of the display of a touch panel 12 on the operation unit 10 in response to the angle of rotation of the operation unit 10 that is detected by the angle sensor of the shaft 11.

Figure 10:
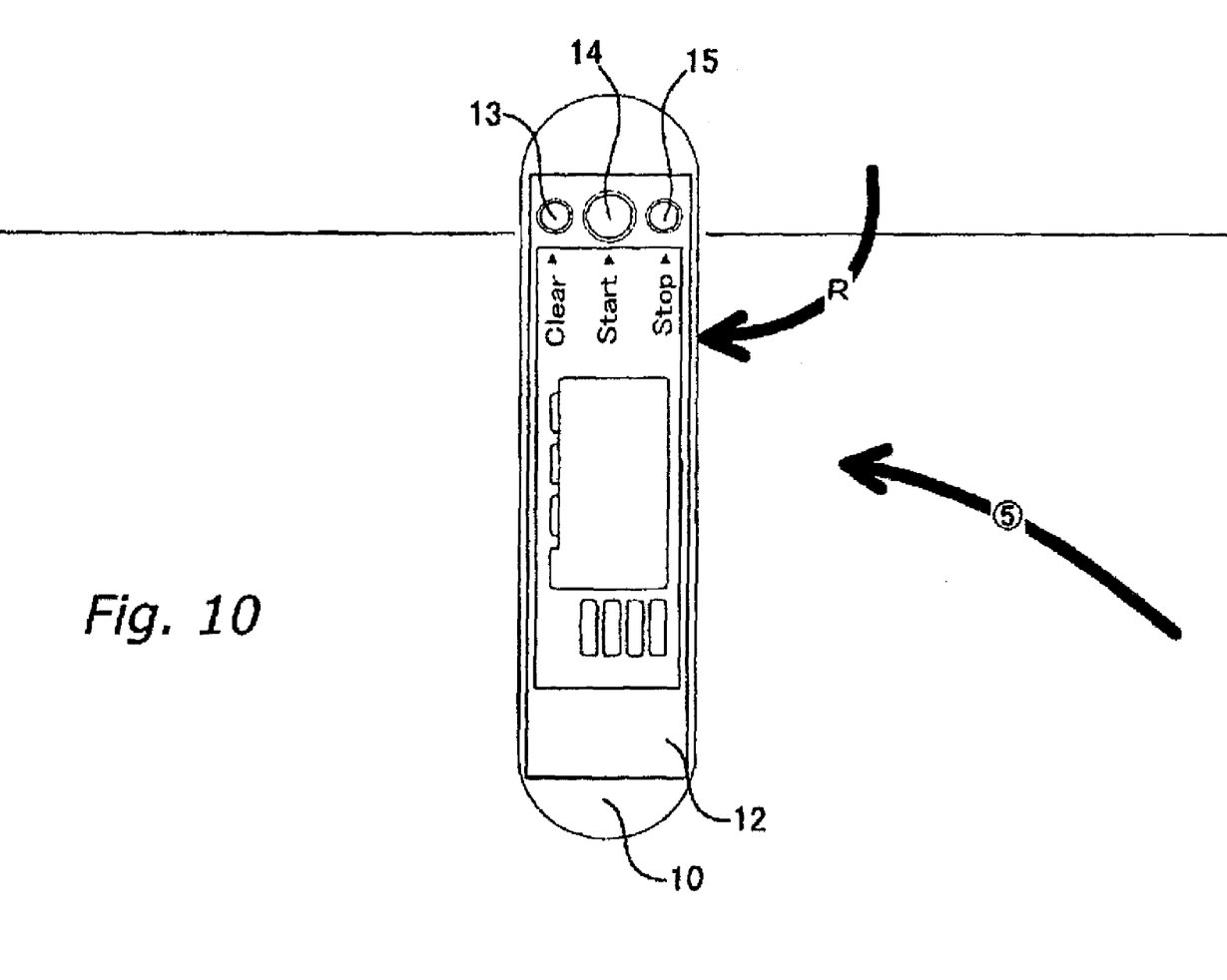
FIG. 10 shows details of the operation unit and its movement.

An example of the display of the touch panel 12 is shown in FIG. 10.

For example, if the user U approaches the image processing device A from the direction indicated by the arrow 5 in FIG. 10 (has the front of the image processing device A on his or her right side), then by rotating the operation unit 10 in the direction of the arrow R in FIG. 10 (clockwise), both the display and the keys on the touch panel 12 such as a clear key 13 (which clears input data), a start key 14 (which orders copying to begin), and a stop key 15 (which stops the imaging process) can be displayed such that they face the user U.

Figure 11:
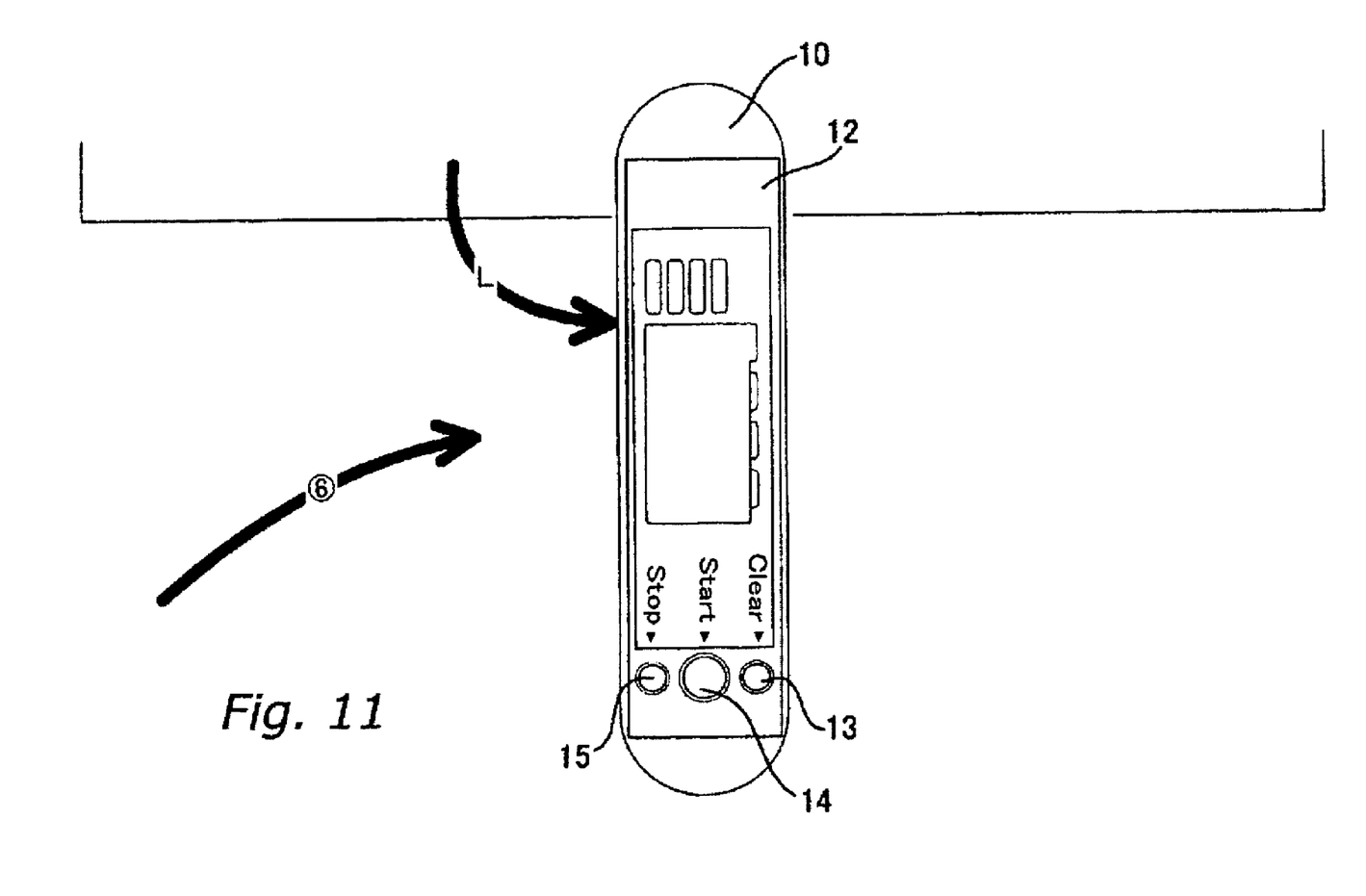
FIG. 11 shows details of the operation unit and its movement.

Furthermore, as shown in FIG. 11, if the user U approaches from the direction indicated by the arrow 6, then by rotating the operation unit 10 in the direction of the arrow L (counterclockwise), both the display and the keys on the touch panel 12 can be displayed such that they face the user U.

Note that if the user U approaches the operation unit 10 from the opposite direction of arrow 5 (FIG. 10) and rotates it in the direction of the arrow R, or if the user U approaches the operation unit 10 from the opposite direction of arrow 6 (FIG. 11) and rotates it in the direction of the arrow L, the display of the operation unit 10 will be upside down with respect to the user U. In this situation, the direction of the display of the operation unit 10 can be reversed by, for example, pushing the clear key down continuously for a predetermined amount of time. Of course, another key can be selected for this purpose.

Figure 12:
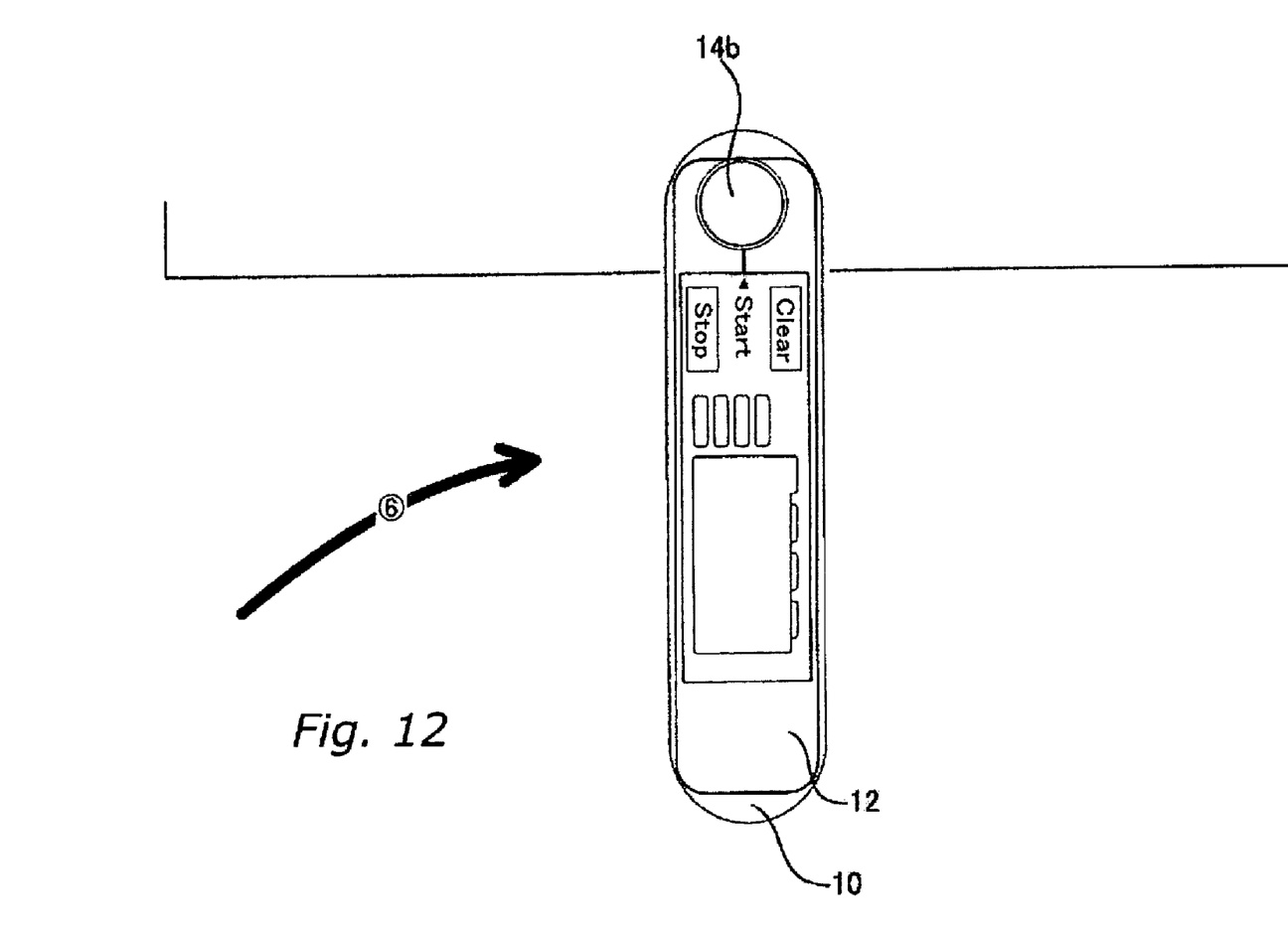
FIG. 12 shows details of the operation unit and its movement.

In addition, FIG. 12 shows another example in which the display on the touch pad 12 can be simplified so that, for example, just a start key 14b is displayed in a larger size.

Enlarging keys like this can be accomplished by, for example, allowing the user U to directly touch the words "clear", "start", and "stop" displayed on the sides of each key.

In addition, the position of the start key 14b in FIG. 12 (the user U has the image processing device A on his or her left) is different than the position of the start key 14 in FIG. 11 (the user has the image processing device A on his or her right).

The display position of the start key can either be established in advance on the operation unit 10, or can be changed at any time by displaying a button or the like that establishes the display position thereof on the touch panel 12.

Note that in the present embodiment, although the operation unit 10 has been described with respect to situations in which it was rotated 90 degrees, it is not limited thereto. If the operation unit is rotated 180 degrees from the position shown in FIG. 5(a) to FIG. 5(c), or from the position shown in FIG.

5(c) to FIG. 5(a), the display on the touch panel 12 can be made easier to view for the user U by rotating it 90 degrees.

Other Embodiments

Figure 5C:
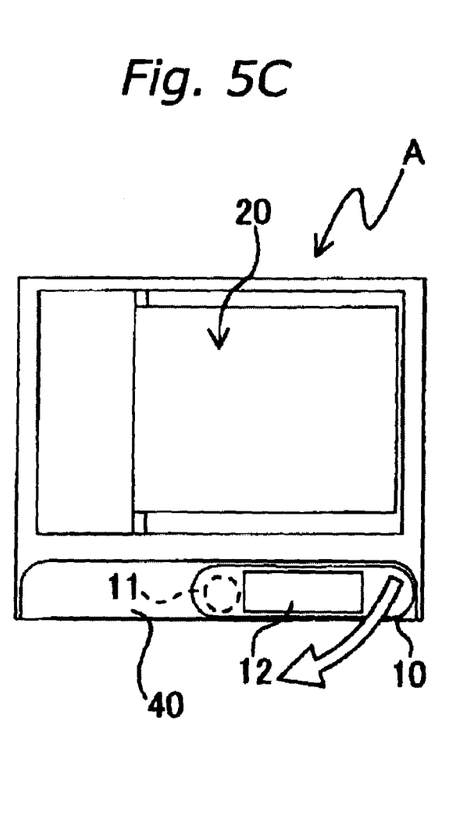

The aforementioned embodiment was described based on a situation in which the operation unit 10 of the image processing device A can be stored in the concave portion 40 by rotating it into the positions shown in FIG. 5(a) and FIG. 5(c). However, the operation unit 10 can be installed in a different manner.

Figure 13:
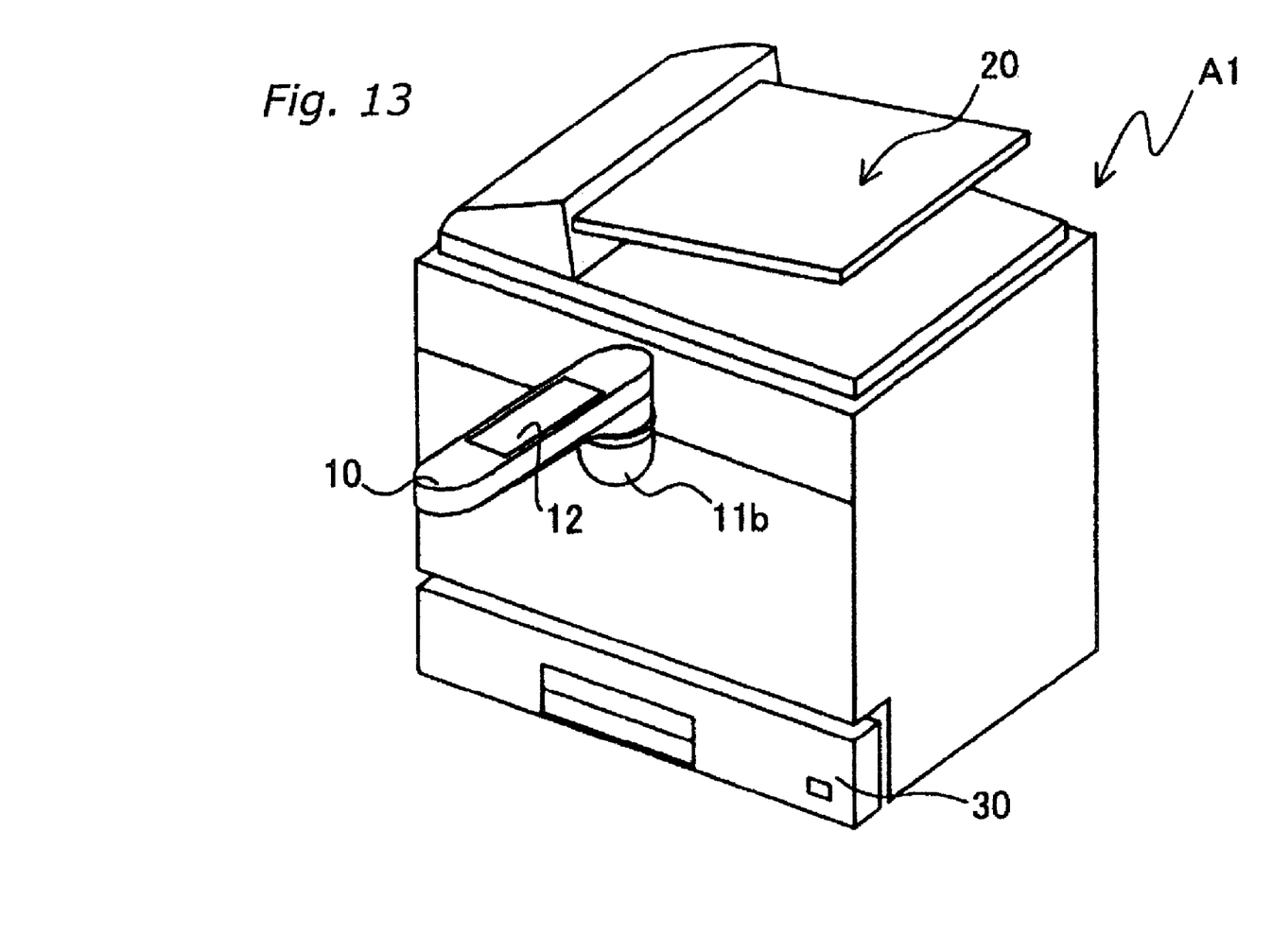
FIG. 13 is a perspective view of a modification of the image processing device A.

For example, as shown in FIG. 13, an image processing device A1 differs from the image processing device A in that it is not equipped with a concave portion 40, it employs a support member 11b that projects out from the exterior line thereof, and the operation unit 10 is installed near the center of the front of thereof.

The support member 11b has a structure which supports the operation unit 10 thereon so that it is freely rotatable therewith. For example, the shaft provided for the operation unit 10 (not shown in the figures) may have a bearing structure that allows the free rotation of the operation unit 10 by means of bearings or the like.

Figure 14:
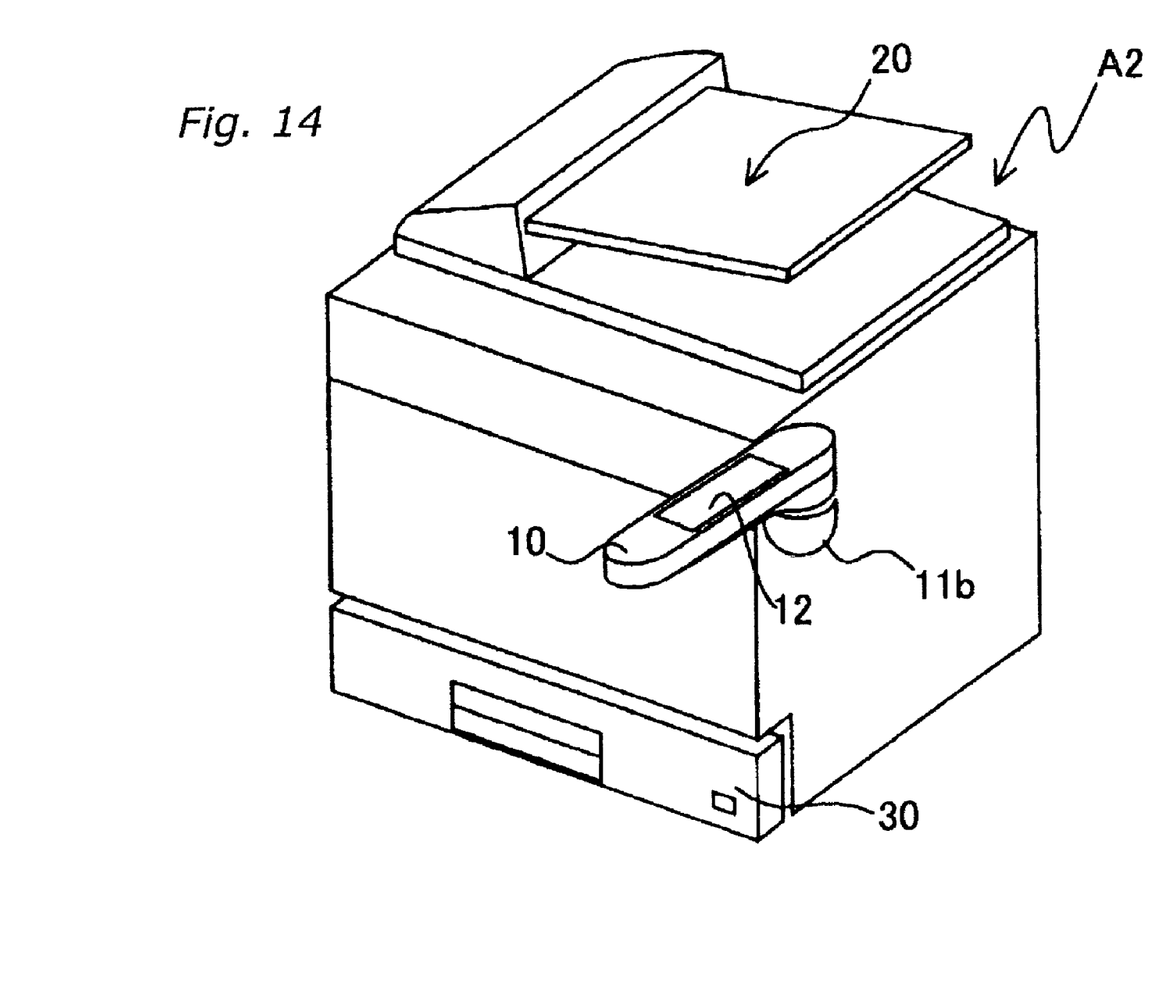
FIG. 14 is a perspective view of another modification of the image processing device A.

In addition, an image processing device A2 shown in FIG. 14 differs from the image processing device A1 in that the support member 11b is provided on a side wall thereof.

Figure 15:
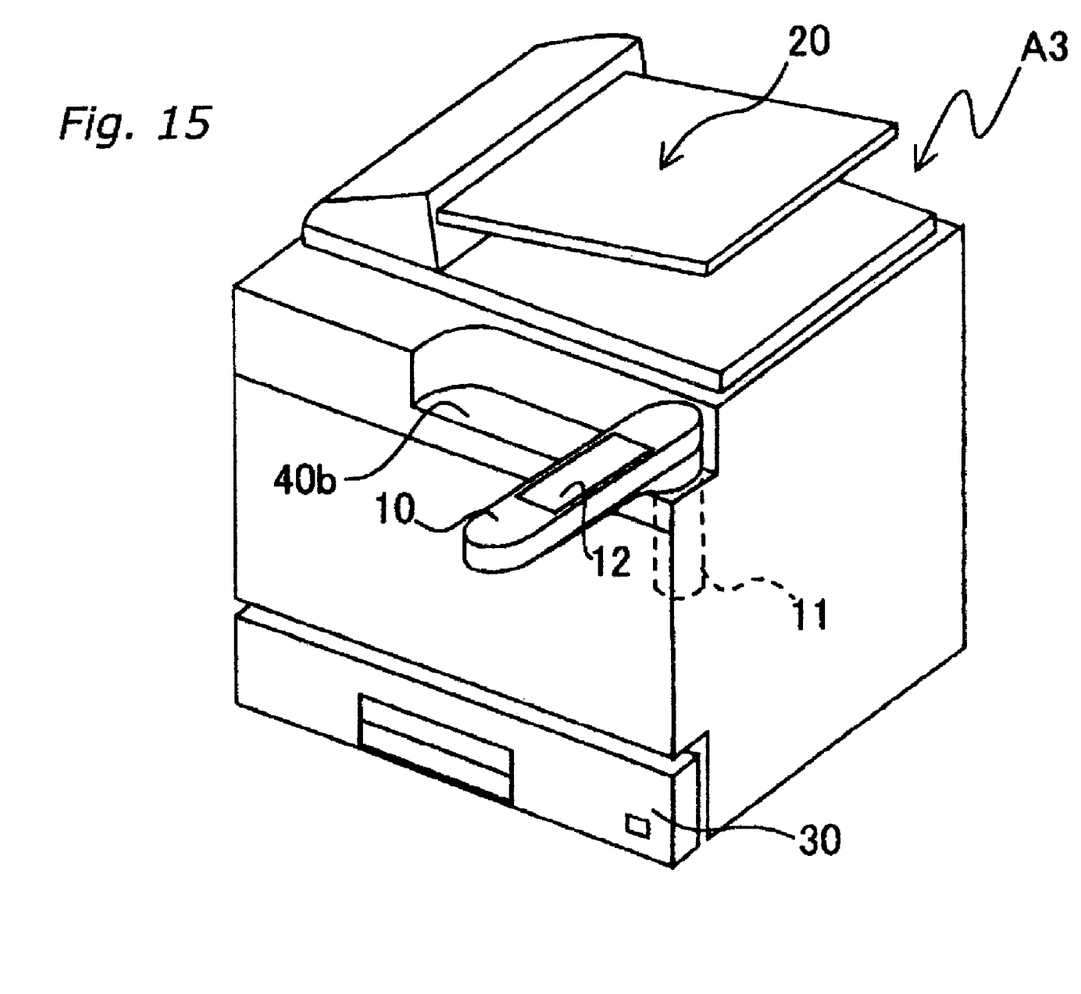
FIG. 15 is a perspective view of yet another modification of the image processing device A.

Furthermore, an image processing device A3 shown in FIG. 15 is equipped with a concave portion 40b that stores the operation unit 10, but differs from the concave portion 40 in the image processing device A in that the position of the concave portion 40b is shifted to one side of the image processing device A3.

Thus, a number of different variations in the placement of the operation unit 10 can be considered, and can be optimally selected by the user U based upon the place in which the image processing device is located, its size, and other factors.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

The invention claimed is:

1. An image processing device, comprising:
a main body having a paper supply cassette and an image processing unit therein, the image processing unit being configured to form and to process images; and
an operation unit being arranged on a front side of the main body, the operation unit having an operation/display screen being configured to direct operation of the image processing unit and to display the processing state of the image processing unit, the operation unit being supported on one end thereof by a shaft extending in an interior of the main body, the operation unit being configured to rotate on the shaft only in a horizontal plane between a position in which the operation unit is parallel to the main body to a position in which the operation unit extends away from the main body and is perpendicular thereto, the operation unit being configured to project out from the front side by rotating the operation unit, the shaft being freely rotatable relative to the main body, and the operation unit being configured to rotate on the shaft; the operation unit is approximately rectangular, and is supported by the main body on one end thereof in the lengthwise direction such that it is freely rotatable therewith, and the main body comprises a concave portion in a front upper surface thereof, the operation unit being configured to be stored in the concave portion.

2. The image processing device set forth in claim 1, wherein the operation unit and the main body are formed such that their upper surfaces are flush with each other when the operation unit is stored in the concave portion.

3. The image processing device set forth in claim 1, wherein the operation unit is supported on a front surface of the main body such that it is freely rotatable therewith.

4. The image processing device set forth in claim 1, wherein the concave portion has a length that is approximately twice that of the operation unit.

5. The image processing device set forth in claim 4, wherein
the operation unit is configured to change an operation unit display direction in response to the angle of rotation.

6. The image processing device set forth in claim 1, wherein
the operation unit is configured to change an operation unit display direction in response to the angle of rotation.

7. The image processing device set forth in claim 1, wherein
the shaft is arranged at a corner of the main body where two side walls intersect.

8. The image processing device set forth in claim 1, wherein
the shaft is arranged at a corner of the main body where two side walls intersect.

9. An image processing device comprising:
a main body having an image processing unit therein, the image processing unit being configured to form and to process images, the main body having a concave portion in a front upper surface thereof; and
an operation unit having an operation/display screen being configured to direct operation of the image processing unit and to display the processing state of the image processing unit, the operation unit being supported on one end thereof by a shaft extending in an interior of the main body to be freely rotatable therewith, and the operation unit being configured to rotate on the shaft in a horizontal plane between a position in which the operation unit is parallel to the main body to a position in which the operation unit extends away from the main body and is perpendicular thereto, the operation unit being configured to be stored in the concave portion,
the concave portion having a length being approximately twice that of the operation unit,
one end of the operation unit being supported by a central portion in a lengthwise direction of the concave portion such that the operation unit is freely rotatable therewith, and
the operation unit being configured to be selectively stored in either of two rotation support portions in the concave portion.

10. An image processing device, comprising:
a main body having a paper supply cassette and an image processing unit therein, the image processing unit being configured to form and to process images; and
an operation unit being arranged on a front side of the main body, the operation unit having an operation/display screen being configured to direct operation of the image processing unit and to display the processing state of the image processing unit, the operation unit being supported on one end thereof by a shaft extending in an interior of the main body, the operation unit being configured to rotate on the shaft only in a horizontal plane between a position in which the operation unit is parallel to the main body to a position in which the operation unit extends away from the main body and is perpendicular thereto, the operation unit being configured to project out from the front side by rotating the operation unit, the shaft being freely rotatable relative to the main body, and the operation unit being configured to rotate on the shaft;

the operation unit is approximately rectangular, and is supported by the main body on one end thereof in the lengthwise direction such that it is freely rotatable therewith, the main body having a concave portion in a side wall thereof, and the operation unit being configured to be stored in the concave portion.

* * * * *